United States Patent
Moriyama et al.

(10) Patent No.: US 12,394,071 B2
(45) Date of Patent: Aug. 19, 2025

(54) TEMPORAL INTERPOLATION OF PRECIPITATION

(71) Applicant: International Business Machines Corporation, Armonk, NY (US)

(72) Inventors: Takao Moriyama, Yokohama (JP); Michiaki Tatsubori, Oiso (JP); Tatsuya Ishikawa, Chuo-ku (JP); Paolo Fraccaro, Warrington (GB)

(73) Assignee: International Business Machines Corporation, Armonk, NY (US)

( * ) Notice: Subject to any disclaimer, the term of this patent is extended or adjusted under 35 U.S.C. 154(b) by 718 days.

(21) Appl. No.: 17/557,490

(22) Filed: Dec. 21, 2021

(65) Prior Publication Data
US 2023/0196594 A1    Jun. 22, 2023

(51) Int. Cl.
*G06T 7/269*        (2017.01)

(52) U.S. Cl.
CPC .... *G06T 7/269* (2017.01); *G06T 2207/20081* (2013.01); *G06T 2207/20084* (2013.01); *G06T 2207/30192* (2013.01)

(58) Field of Classification Search
CPC ........... G06T 7/269; G06T 2207/20081; G06T 2207/20084; G06T 2207/30192; G06T 3/4007; G06T 3/4046
USPC ...................................................... 382/107
See application file for complete search history.

(56) References Cited

U.S. PATENT DOCUMENTS

| | | |
|---|---|---|
| 10,776,688 B2 | 9/2020 | Jiang |
| 10,866,342 B2 | 12/2020 | Alvarez |
| 2014/0330529 A1* | 11/2014 | Bornoff ................... G06F 30/23 702/45 |
| 2019/0138889 A1* | 5/2019 | Jiang ...................... G06N 3/045 |
| 2020/0160065 A1 | 5/2020 | Weinzaepfel |
| 2021/0103051 A1* | 4/2021 | Tang ....................... G01S 7/417 |

(Continued)

FOREIGN PATENT DOCUMENTS

CN         101349767 B      6/2012

OTHER PUBLICATIONS

International Searching Authority, "Notification of Transmittal of the International Search Report and the Written Opinion of the International Searching Authority, or the Declaration", File Reference PF221029PCT, International application No. PCT/CN2022/130578, International Filing Date Nov. 8, 2022, Mailed on Jan. 28, 2023, 10 pages.

(Continued)

*Primary Examiner* — Jennifer Mehmood
*Assistant Examiner* — Pardis Sohraby
(74) *Attorney, Agent, or Firm* — Anthony M. Pallone (57) ABSTRACT

In a method for training temporal precipitation interpolation models, the method may include receiving an initial image, a first intermediate image, and a final image, computing a first preliminary forward optical flow vector field from the initial image, and a first preliminary backward optical flow vector field, computing a first refined forward optical flow vector field and a first refined backward optical flow vector field using a terrain factor, among other things, and computing backpropagation losses to train neural networks by comparing the first intermediate image to an interpolated frame calculated using the first refined forward optical flow vector field and the first refined backward optical flow vector field.

17 Claims, 5 Drawing Sheets

(56) References Cited

U.S. PATENT DOCUMENTS

| | | | | |
|---|---|---|---|---|
| 2023/0138053 A1* | 5/2023 | Liu | ............... | G06V 20/40 |
| | | | | 382/156 |
| 2024/0146868 A1* | 5/2024 | Zhang | ............ | G06V 20/44 |

OTHER PUBLICATIONS

"Measure Rain and Snow for the Benefit of All", Global Precipitation Measure, Dual-Frequency Precipitation Radar, Printed Oct. 7, 2021, 2 pages, <https://www.eorc.jaxa.jp/GPM/en/overview.html>.

"Predicting impacts of weather-driven urban disasters in the current and future climate", IBM Journal of Research and Development, vol. 64, Issue 1/2, Paper 6, Jan./Mar. 2019, 13 pages, <https://ieeexplore.ieee.org/document/8865409>.

Bechini et al., "An Enhanced Optical Flow Technique for Radar Nowcasting of Precipitation and Winds", Journal of Atmospheric and Oceanic Technology, 34(12), 2637-2658, <https://journals.ametsoc.org/view/journals/atot/34/12/tech-d-17-0110.1.XML>.

Jiang et al., "Super SloMo: High Quality Estimation of Multiple Intermediate Frames for Video Interpolation", 2018 EEE/CVF Conference on Computer Vision and Pattern Recognition, Salt Lake City, UT, USA, Jun. 18-23, 2018, 12 pages, <https://www.semanticscholar.org/paper/Super-SloMo%3A-High-Quality-Estimation-of-Multiple-Jiang-Sun/baa1ae74fbf7ed6204f2f6364d51375ff81aabc1>.

Nielson et al., "A numerical method to generate high temporal resolution precipitation time series by combining weather radar measurements with a nowcast model", Atmospheric Research, vol. 138, Mar. 1, 2014, 12 pages, <https://www.sciencedirect.com/science/article/pii/S0169809513002883>.

Spock et al., "Spatio-Temporal Interpolation of Precipitation including covariates: during monsoon periods in Pakistan", Pakistan Journal of Statistics, Jul. 2012, 16 pages, <https://www.researchgate.net/publication/233747221>.

Vandal et al., "Optical Flow for Intermediate Frame Interpolation of Multispectral Geostationary Satellite Data", Abstract Only <https://ntrs.nasa.gov/citations/20190033878>.

Vandal et al., "Temporal Interpolation of Geostationary Satellite Imagery With Task Specific Optical Flow", arXiv, Cornell University, arXiv: 1907.12013v3, Mar. 3, 2020, 14 pages, <https://arxiv.org/pdf/1907.12013.pdf>.

Zaher et al., "Comparative study of algorithms for cloud motion estimation using sky-imaging data", IFAC-PapersOnLine, vol. 50, Issue 1, Jul. 2017, pp. 5934-5939, <https://www.sciencedirect.com/science/article/pii/S2405896317320657>.

* cited by examiner

TEMPORAL INTERPOLATION OF PRECIPITATION

BACKGROUND

The present invention relates generally to the field of climate impact modeling, and more particularly to temporal interpolation of precipitation observation from satellite radars.

Precipitation is one of the main causes of fatal natural disasters, as the resultant hydrological buildup can cause flooding, landslides, snow avalanches, crop damage, road and bridge washout, and other problematic infrastructure destruction. Satellite observations can be an effective way to measure global-scale rainfall but can be limited in utility due to infrequent coverage of a region. Ground-based rainfall observation networks such as rain gauges or weather radars can also be effective at measuring rainfall, and provide more frequent observation. In certain regions of the world, however, ground observation networks are often unavailable even though many of these regions suffer water related damage.

Mathematical and computational models such as integrated flood management (IFM) have become widely used tools to predict and mitigate risks from precipitation and accompanying water buildup. For these predictions to be accurate, however, the simulations powering the predictions require well-resolved spatial and temporal precipitation data. Forecasting precipitation at very high resolutions in space and time, particularly with the aim of providing the boundary conditions for hydrological models and estimating the associated risk, is one of the most difficult challenges in meteorology.

SUMMARY

According to one embodiment of the present invention, a computer-implemented method, a computer program product, and a computer system are provided for training temporal precipitation interpolation models. The method may include receiving an initial image, a first intermediate image, and a final image showing precipitation in a region. The initial image may be captured at an initial time, the first intermediate image may be captured at a first target time after the initial time, and the final image may be captured at a final time after the first target time. The method may also include computing a first preliminary forward optical flow vector field from the initial image to the first target time, and a first preliminary backward optical flow vector field from the final image to the first target time using a first neural network, and computing a first refined forward optical flow vector field and a first refined backward optical flow vector field for the first target time by inputting (i) the initial image, (ii) the final image, (iii) the first preliminary forward optical flow vector field, (iv) the first preliminary backward optical flow vector field, and (v) a terrain factor into a second neural network. The terrain factor may include a rain motion pressure feature. The method may also include computing backpropagation losses to train the first neural network and the second neural network by comparing the first intermediate image to an interpolated frame calculated using the first refined forward optical flow vector field and the first refined backward optical flow vector field.

DETAILED DESCRIPTION

The disclosed embodiments include an approach for training temporal precipitation interpolation models.

Figure 1:
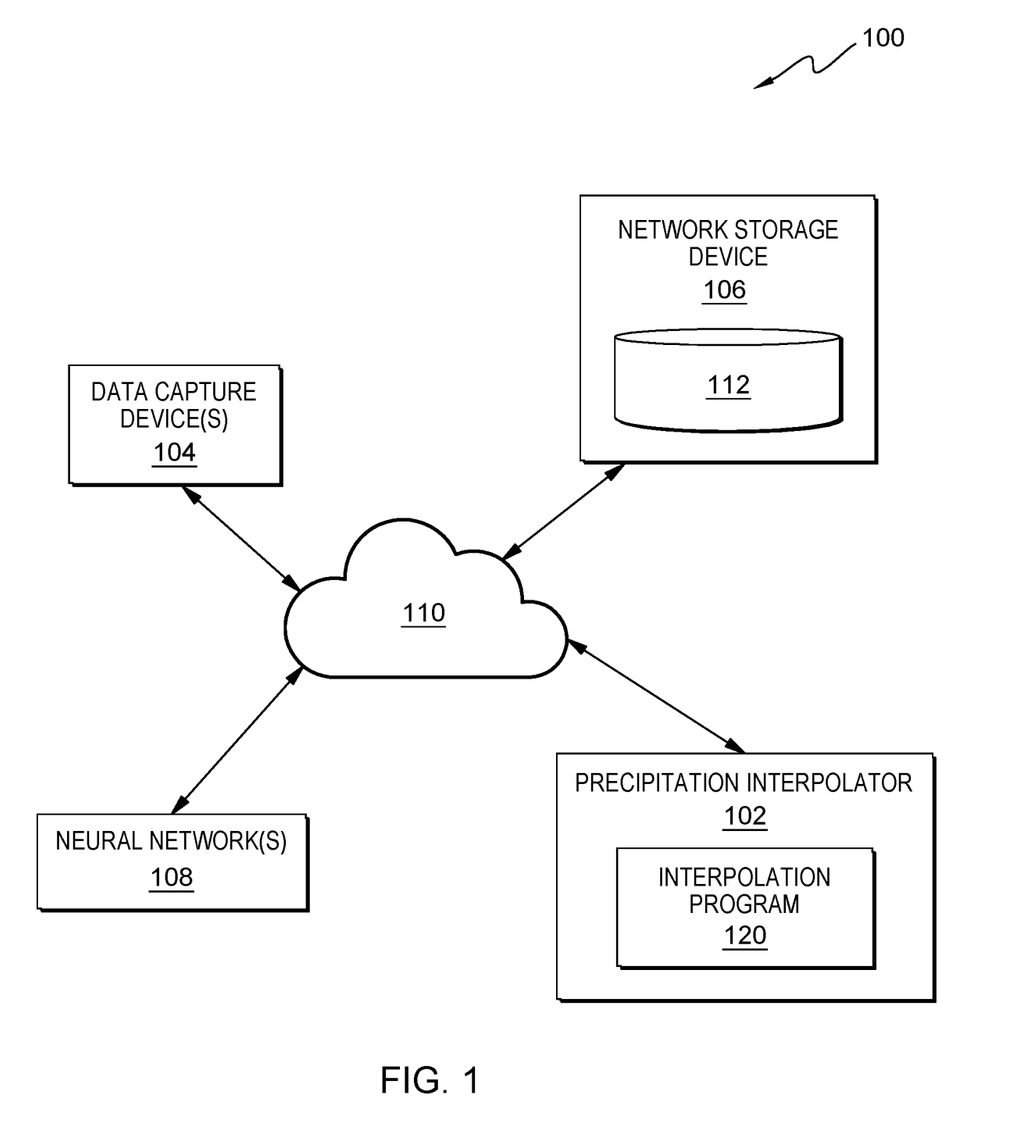
FIG. 1 is a functional block diagram illustrating a weather modeling environment, in accordance with an embodiment of the present invention.

FIG. 1 depicts a functional block diagram illustrating a weather modeling environment 100, in accordance with one embodiment of the present invention. FIG. 1 provides only an illustration of one implementation and does not imply any limitations regarding the environments in which different embodiments may be implemented. Many modifications to the depicted environment may be made by those skilled in the art without departing from the scope of the invention as recited by the claims.

The weather modeling environment 100 includes a precipitation interpolator 102, data capture devices 104, a network storage device 106, and neural networks 108 connected over a network 110. The network 110 can be, for example, a telecommunications network, a local area network (LAN), a wide area network (WAN), such as the Internet, or a combination of the three, and can include wired, wireless, or fiber optic connections. The network 110 can include one or more wired and/or wireless networks that are capable of receiving and transmitting data, voice, and/or video signals, including multimedia signals that include voice, data, and video information. In general, the network 110 can be any combination of connections and protocols that will support communications between the network storage device 106, and other computing devices (not shown) within the computational environment 100. In various embodiments, the network 110 operates locally via wired, wireless, or optical connections and can be any combination of connections and protocols (e.g., personal area network (PAN), near field communication (NFC), laser, infrared, ultrasonic, etc.).

The network storage device 106 can be a standalone computing device, a management server, a web server, a mobile computing device, or any other electronic device or computing system capable of receiving, sending, and processing data. In other embodiments, the network storage device 106 can represent a server computing system utilizing multiple computers as a server system, such as in a cloud computing environment. In another embodiment, the network storage device 106 can be a laptop computer, a tablet computer, a netbook computer, a personal computer (PC), a desktop computer, a personal digital assistant (PDA), a smart phone, or any programmable electronic device capable of communicating with other computing devices (not shown) within the weather modeling environment 100 via the network 110. In another embodiment, the network storage device 106 represents a computing system utilizing connected computers and components (e.g., database server computers, application server computers, etc.) that act as a single pool of seamless resources when accessed within the computational environment 100. In the depicted embodiment, the network storage device 106 includes a corpus 112 containing data sets, data points, or other information captured by the data capture devices 104. In other embodiments, the network storage device 106 may contain other applications, databases, programs, etc. which have not been depicted in the weather modeling environment 100. The network storage device 106 may include internal and external hardware components, as depicted and described in further detail with respect to FIG. 5.

The corpus 112 is a repository for data used by the weather modeling environment 100. In the depicted embodiment, the corpus 112 resides on the network storage device 106. In another embodiment, the corpus 112 may reside elsewhere within the weather modeling environment 100, provided the precipitation interpolator 102, the data captures devices 104, and the neural networks 108 have access to the corpus 112. In certain embodiments, the corpus 112 stores a data stream, such as sets of training data, data structures, and/or variables used to fit the parameters of a specified model. The data stream may include pairs of input vectors with associated output vectors. The corpus 112 may more generally contain one or more sets of one or more instances of unclassified data.

The corpus 112 may include data captured by the data capture devices 106. The data capture devices 106 may include orbiting observation devices such as radar satellites, photographic satellites, infrared satellites, water vapor detection satellites, or other large-scale image capture devices. The data capture devices 106 may also include ground-based observation devices such as rain gauges, weather radars. For certain regions or locations, the number of data capture devices 106 may be limited, especially for the ground-based observation devices. In these regions in particular, the weather modeling environment 100 benefits from the precipitation interpolator 102 using an interpolation program 120 to interpolate precipitation with data captured less often by the orbiting observation devices.

The interpolation program 120 receives data from the corpus 112, and utilizes the neural networks 108 to interpolate precipitation or other weather patterns for use in predictive hydrologic runoff or flooding models. In the depicted embodiment, the interpolation program 120 is a standalone software program. In another embodiment, the functionality of the interpolation program 120, or any combination programs thereof, may be integrated into a single software program. In some embodiments, the interpolation program 120 may be located on several separate computing devices (not depicted) but can still communicate over the network 110. In various embodiments, client versions of the interpolation program 120 may reside on any other computing device within the computational environment 100. The interpolation program 120 is depicted and described in further detail with respect to FIG. 2.

Figure 2:
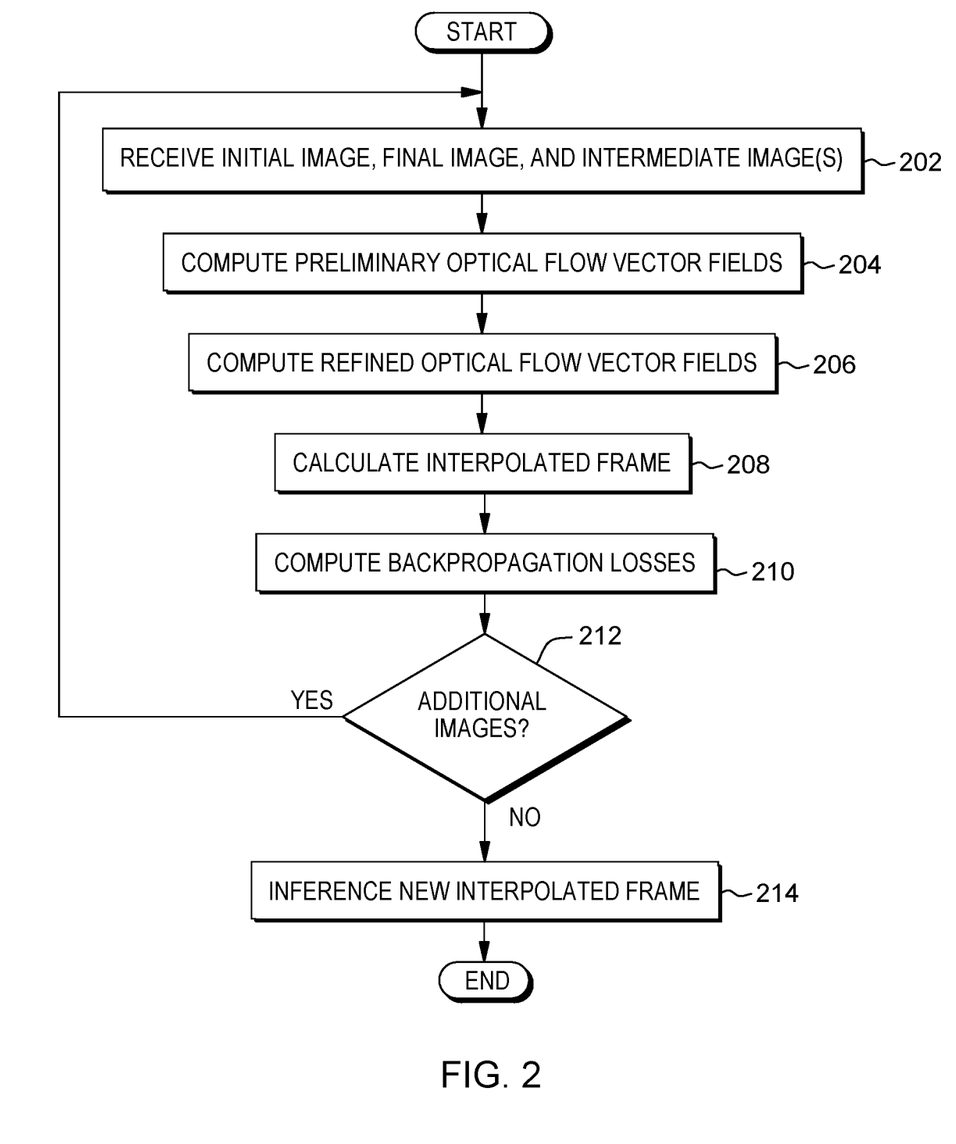
FIG. 2 depicts operational procedures of the interpolation program 120 of FIG. 1, in accordance with an embodiment of the present invention.

FIG. 2 depicts operational procedures of the interpolation program 120 of FIG. 1, in accordance with an embodiment of the present invention. The interpolation program 120 receives a data set having at least an initial image, a final image, and an intermediate image. (block 202). The initial image may be captured at an initial time, the first intermediate image may be captured at a first target time after the initial time, and the final image may be captured at a final time after the first target time. The data set may include a variety of types of images from different sources and capturing techniques. The data may be captured in real time and updated with additional data points over time. Between the initial image and final image, the interpolation program 120 may receive any number of intermediate images. Furthermore, the interpolation program 120 may receive additional data sets that all have an initial image, a final image, and an intermediate image. Additionally or alternatively, the interpolation program 120 may receive a sequence of images, and subsequently select an initial image, a final image, and an intermediate image from the sequence.

Figure 3:
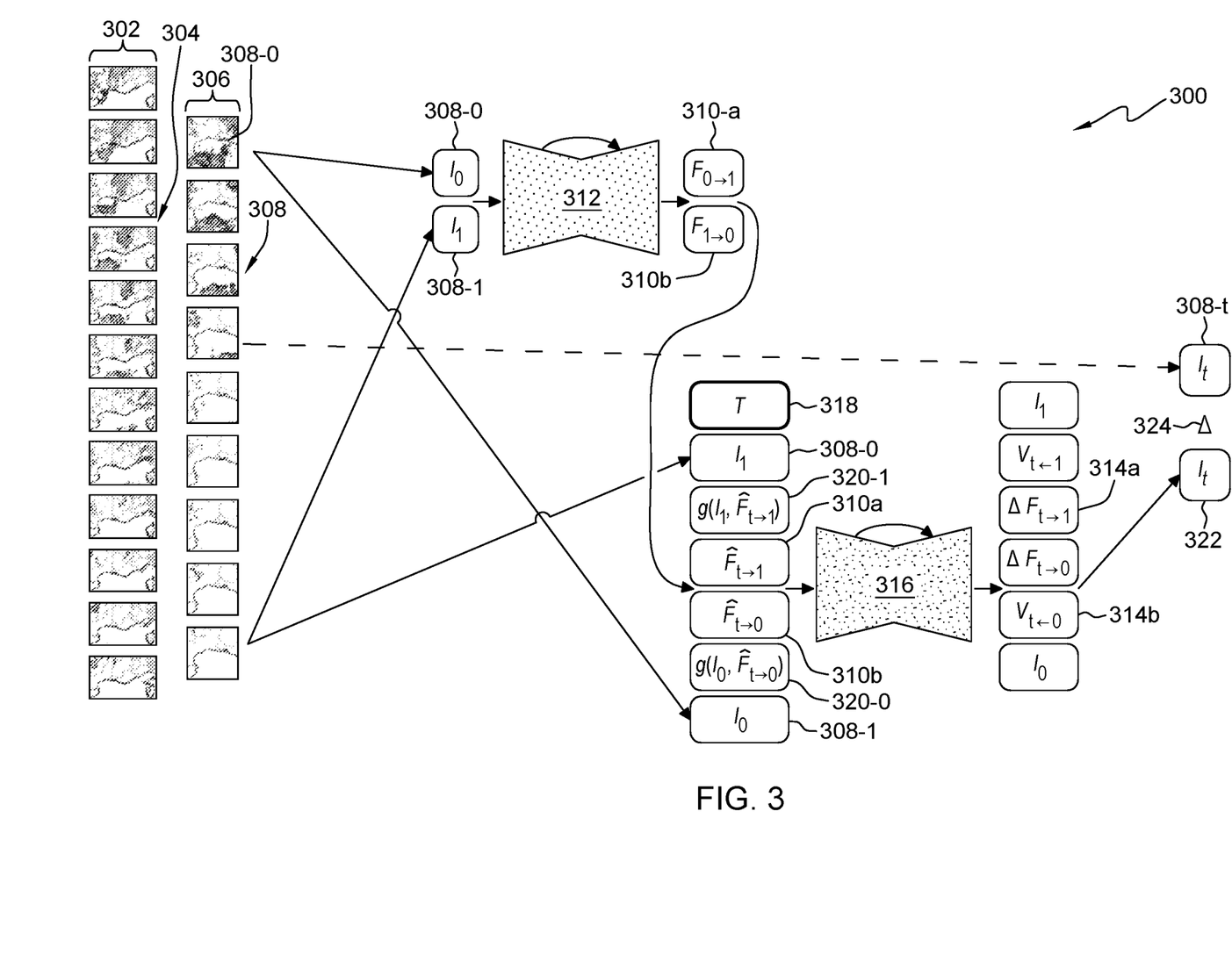
FIG. 3 depicts a representative diagram 300 showing component interactions for the operations of the interpolation program 120, in accordance with an embodiment of the present invention.

FIG. 3 depicts a representative diagram 300 showing component interactions for the operations of the interpolation program 120, in accordance with an embodiment of the present invention. The initial image, final image, and intermediate image received by the interpolation program 120 may be selected or received from a first image stream 302 of first images 304 that are captured at regular or irregular intervals (e.g., by the data capture devices 104). The image stream 306 may be captured at one interval and resolution, while a second image stream 306 is trimmed by interval or resolution such that second images 308 are delivered to the interpolation program 120 with a second interval and resolution. For example, the first stream 306 may be captured every half hour at a resolution of 515 pixels by 784 pixels. For purposes of training the neural networks 108, however, the interpolation program 120 may receive the second images 308 that are reduced in number (twelve first images 304 versus nine second images 308) at resolutions of 352 pixels by 352 pixels. Other resolutions may also be used by the interpolation program 120 to tailor the training process.

With reference back to FIG. 2, the interpolation program 120 computes preliminary optical flow vector fields (block 204). Preliminary optical flow vector fields 310a, b are shown in FIG. 3 as being computed using a first neural network 312. The interpolation program 120 inputs an initial image 308-0 and a final image 308-1 selected from the second image stream 306 into the first neural network 312. The initial image 308-0 is captured at an initial time (T=0), and the final image 308-1 is captured at a final time (T=1). The interpolation program 120 also selects an intermediate image 308-t captured at a target time (T=t). The initial image 308-0 and the final image 308-1 are illustrated in FIG. 3 as the extreme options (i.e., initial image 308-0 is the top of the second image stream 306 and final image 308-1 is the bottom of the second image stream 306), but any of the second image stream 306 may be selected as long as the initial time is before the final time, and the target time is between the initial time and the final time.

When the interpolation program 120 inputs the initial image 308-0 and the final image 308-1 at times T=0 and T=1, the goal is to predict the intermediate precipitation, at the target time T=t. Existing multi-frames video interpolation approaches (e.g., SuperSloMo) allow arbitrary times to be selected between T=0 and T=1. The first neural network 312 may include a convolutional neural network being trained to produce a preliminary forward optical flow vector field 310a and a preliminary backward flow vector field 310b. The preliminary forward optical flow vector field 310a is calculated to show the precipitation motion from the initial image 308-0 captured at the initial time (T=0) to a first target time (T=t); and the preliminary backward optical flow vector field 310b is calculated to show the precipitation motion from the final image 308-1 to the first target time.

Once again referencing FIG. 2, the interpolation program 120 then computes refined optical flow vector fields (block 206). FIG. 3 shows a refined forward optical flow vector field 314a and a refined backward optical flow vector field 314b computed using a second neural network 316 (e.g., convolutional neural network). The interpolation program 120 inputs the initial image 308-0, the final image 308-1, the first preliminary forward optical flow vector field 310a, the first preliminary backward optical flow vector field 310b, and a terrain factor 318 into the second neural network 316. The terrain factor 318 may include a rain motion pressure feature.

Figure 4:
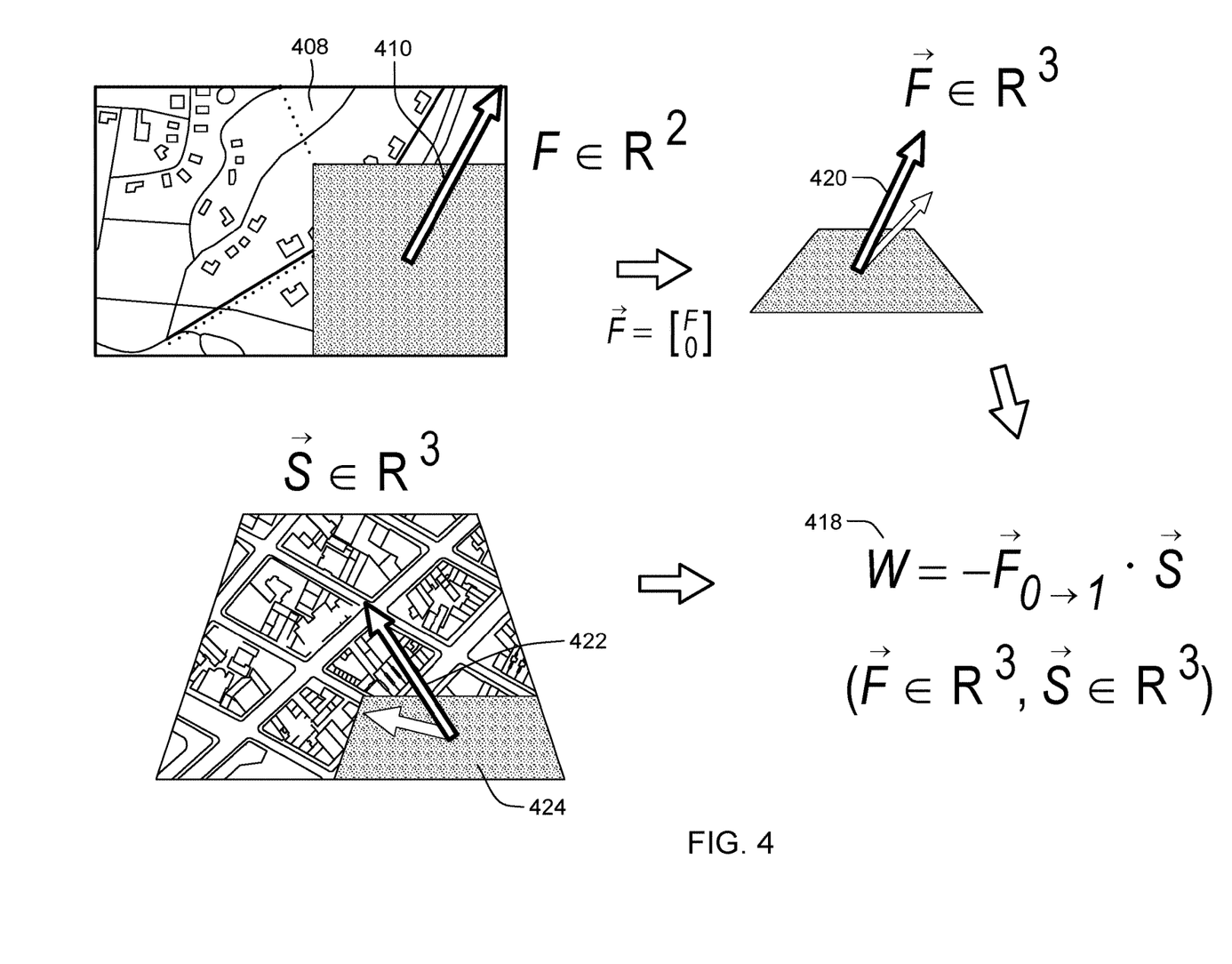
FIG. 4 depicts a representative diagram 400 showing component interactions for the operations of the interpolation program 120, in accordance with an embodiment of the present invention.

FIG. 4 depicts a representative diagram 400 showing component interactions for the operations of the interpolation program 120, in accordance with an embodiment of the present invention. FIG. 4 shows one way that the rain motion pressure feature may be calculated from a preliminary forward optical flow vector field 420 and a gradient vectors 422 of a topographical elevation map 424. The preliminary forward optical flow vector field 420 may be derived from preliminary forward optical flow vector fields 410 computed as described above. The preliminary forward optical flow vector fields 410 are then translated to three dimensions by supplementing 0 for the third dimension (vertical, height dimension). The translated three-dimensional preliminary forward optical flow vector field 420 are then combined with the three-dimensional gradient vectors 422 through a calculation of an element-wise negative inner-product of the first preliminary forward optical flow vector field 420 and the gradient vectors 422 to produce a terrain factor 418. Or, in certain embodiments, the inner-product can be computed between the 2-D vectors of an optical flow and a topographic gradient.

In addition to the terrain factor 418 calculated as the combination of preliminary forward optical flow vectors 420 and three-dimensional topographical vectors 422, the terrain factor 318 as input into the second neural network 316 may include the topographical map as-is in the entirety. That is, the topographical vectors 422 may be input directly into the second neural network 316 for the second neural network 316 to evaluate as additional starting references.

The terrain factor 318 may also include spatially interpolated ground observations as another factor to be input into the second neural network 316. Interpolation of the ground observations may be done linearly, or using a different or additional neural network. That is, ground observations from gauges, weather stations, radar, flood, runoff measurements, and parameters derived from land cover types or land use types, may be input as part of the terrain factor 318, and the ground observations from gauges, weather stations, radar, flood and runoff measurements, may be interpolated to compute additional ground observation data points that may be included within the terrain factor 318.

In certain embodiments, the interpolation program 120 may also input an initial warping function g 320-0 for the initial image 308-0 and a final warping function g 320-1 for the final image 308-1. The warping functions 320-0, 320-1 are implemented using bilinear interpolation. The warping function g may be defined as a function that shifts the locations of the original precipitation values based on the flow vectors and then resample interpolated values in the warped final image for each location. For example, a value at (i, j) is shifted with a given flow vector (di, dj) to (i−di, j−dj). New values in a warped image are computed as weighted-averaging shifted values around the original (i, j) value.

The interpolation program 120 may also calculate an interpolated frame 322 using the first refined forward optical flow vector field 314a and the first refined backward optical flow vector field 314b (block 208). Once the interpolated frame 322 has been calculated, the interpolation program 120 may compute backpropagation losses 324 to train the first neural network 312 and the second neural network 316 (block 210). The backpropagation losses 324 may be determined by comparing the first intermediate image 308-t to the interpolated frame 322. The approaches of unsupervised deep optical flow learning performed by the first neural network 312 and the second neural network 316 treat the reconstruction and photometric errors between the warped feature map from the interpolated frame 322 and the first intermediate image 308-t as a loss to be backpropagated. If the level of intensity is not constant between the interpolated frame 322 and the first intermediate image 308-t, however, then the motion estimate can be biased. The interpolation program 120 may therefore introduce an additional dimension in the optical-flow vectors which represent intensity change. Instead of F=(Δx; Δy), now we rely on F=(Δx; Δy; Δz), where Δz represents the precipitation intensity increase from original grids. The backpropagation losses 324 may include reconstruction losses, perceptual losses, warping losses, and smoothness losses. The interpolation program 120 may then backpropagate the backpropagation losses 324 to update the parameters of the first neural network 312 and the second neural network 316.

The interpolation program 120 may determine whether there are additional images for training the neural networks 312, 316 (block 212). If there are additional images (block 212, "Yes"), the interpolation program 120 repeats the process shown in FIG. 2 with multiple selections of intermediate images collected at different target times. For example, the interpolation program 120 may receive a second intermediate image 308-$t_2$ captured at a second target time between the initial time of the initial image 308-0 and the final time of the final image 308-1. The interpolation program 120 may then compute a second refined forward optical flow vector field and a second refined backward optical flow vector field for the second target time using the first neural network 312. The interpolation program 120 may then compute additional backpropagation losses to train the first neural network 312 and the second neural network 316 by comparing the second intermediate image 308-$t_2$ to a second interpolated frame obtained by interpolating using the second refined forward optical flow vector field and the second refined backward optical flow vector field.

The interpolation program 120 may also calculate additional refined optical flow vector fields by selecting new initial times and final times. For example, a first initial time, target time, and final time may be three consecutive observations captured at the start of a time period (e.g., 00:00, 00:30, and 01:00). The first initial time, target time, and final time may be used to train the neural networks 312, 316, after which a new initial time, target time, and final time may be the three consecutive observations that are taken directly after the first initial time, target time, and final time (e.g., 01:30, 02:00, 02:30).

When there are no additional images remaining for training the neural networks 312, 316 (block 212, "No"), the interpolation program 120 finishes training, and may be used to inference a new interpolated frame from a new initial image and a new final image (block 214).

Figure 5:
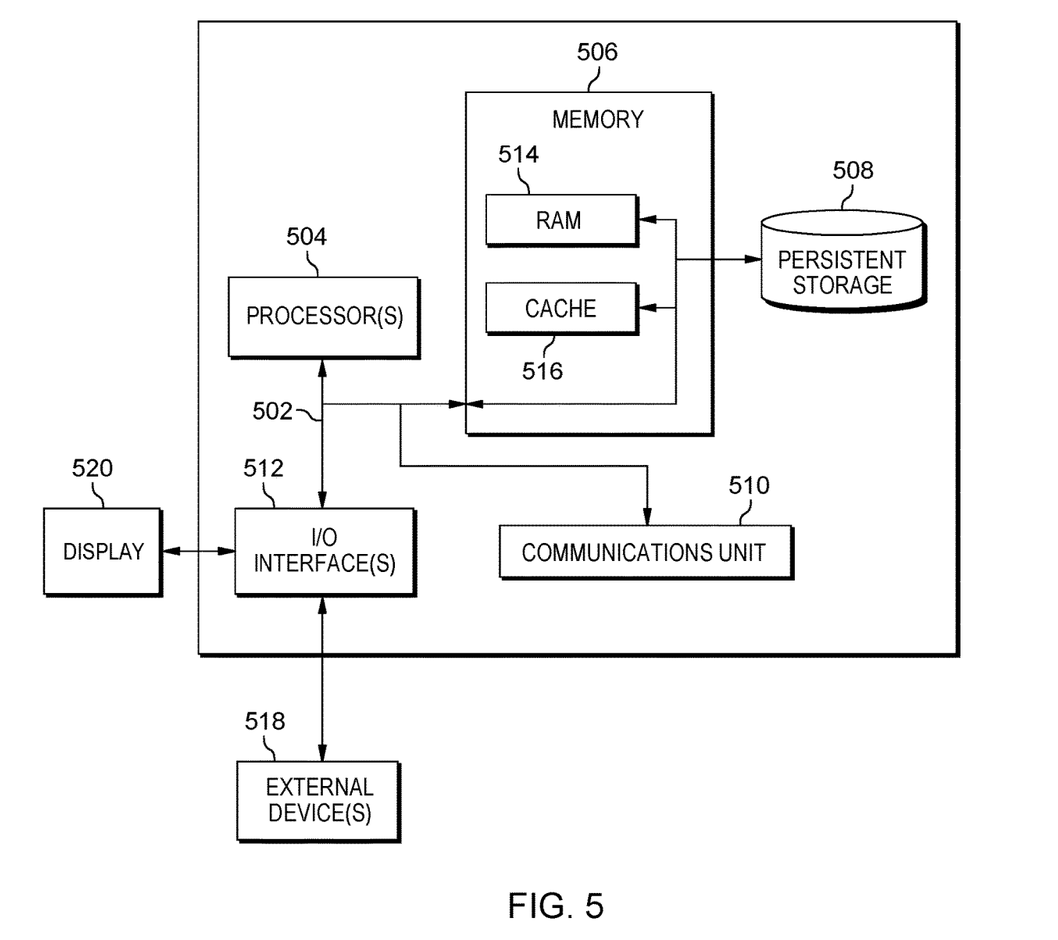
FIG. 5 depicts a block diagram of components of a computing device in accordance with an illustrative embodiment of the present invention.

FIG. 5 depicts a block diagram of components of a computing device 500 in accordance with an illustrative embodiment of the present invention. As described above, the computing device 500 may represent any of the devices (e.g., precipitation interpolator 102, data capture devices 104, network storage device 106, or neural networks 108) described above, or a combination of the devices, in the embodiments where the devices are embodied as components of a single computing device 500. It should be appreciated that FIG. 5 provides only an illustration of one implementation and does not imply any limitations with regard to the environments in which different embodiments may be implemented. Many modifications to the depicted environment may be made.

The computing device 500 includes communications fabric 502, which provides communications between RAM 514, cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

The software components (e.g., interpolation program 120) may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. The proxy, application, access manager, collection page, authentication tool, or multi-factor authentication page may be downloaded to persistent storage 508 through communications unit 510.

I/O interface(s) 512 allows for input and output of data with other devices that may be connected to the computing device 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention (e.g., rule generating program 130) can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for training temporal precipitation interpolation models, comprising:
    receiving, by one or more processors, an initial image, a first intermediate image, and a final image showing precipitation in a region, wherein the initial image is captured at an initial time, the first intermediate image is captured at a first target time after the initial time, and the final image is captured at a final time after the first target time;
    computing a first preliminary forward optical flow vector field from the initial image to the first target time, and a first preliminary backward optical flow vector field from the final image to the first target time using a first neural network;
    computing a first refined forward optical flow vector field and a first refined backward optical flow vector field for the first target time by inputting (i) the initial image, (ii) the final image, (iii) the first preliminary forward optical flow vector field, (iv) the first preliminary backward optical flow vector field, and (v) a terrain factor into a second neural network, wherein the terrain factor comprises a rain motion pressure feature calculated via an element-wise negative inner-product of the first preliminary forward optical flow vector field and a topographic gradient vector field of a topographical elevation map; and
    computing backpropagation losses to train the first neural network and the second neural network by comparing the first intermediate image to an interpolated frame calculated using the first refined forward optical flow vector field and the first refined backward optical flow vector field.

2. The computer-implemented method of claim 1, wherein the terrain factor comprises a spatially interpolated ground observation.

3. The computer-implemented method of claim 1, wherein the terrain factor comprises a topographical elevation map.

4. The computer-implemented method of claim 1, further comprising:
    receiving a second intermediate image captured at a second intermediate time between the initial time and the final time;
    computing a second refined forward optical flow vector field and a second refined backward optical flow vector field for the second target time; and
    computing additional backpropagation losses to train the first neural network and the second neural network by comparing the second intermediate image to a second interpolated frame obtained by interpolating using the second refined forward optical flow vector field and the second refined backward optical flow vector field.

5. The computer-implemented method of claim 1, wherein the backpropagation losses comprise a selection from the group consisting of: reconstruction losses, perceptual losses, warping losses, and smoothness losses.

6. The computer-implemented method of claim 1, further comprising using the first neural network and the second neural network to inference a new interpolated frame from a new initial image and a new final image.

7. A computer program product for training temporal precipitation interpolation models, comprising:
    one or more computer readable storage media, and program instructions collectively stored on at least one of the one or more computer readable storage media, the program instructions executable by a processor, the program instructions comprising:
        program instructions to receive an initial image, a first intermediate image, and a final image showing precipitation in a region, wherein the initial image is captured at an initial time, the first intermediate image is captured at a first target time after the initial time, and the final image is captured at a final time after the first target time;

program instructions to compute a first preliminary forward optical flow vector field from the initial image to the first target time, and a first preliminary backward optical flow vector field from the final image to the first target time using a first neural network;

program instructions to compute a first refined forward optical flow vector field and a first refined backward optical flow vector field for the first target time by inputting (i) the initial image, (ii) the final image, (iii) the first preliminary forward optical flow vector field, (iv) the first preliminary backward optical flow vector field, and (v) a terrain factor into a second neural network, wherein the terrain factor comprises a rain motion pressure feature calculated via an element-wise negative inner-product of the first preliminary forward optical flow vector field and a topographic gradient vector field of a topographical elevation map; and program instructions to compute backpropagation losses to train the first neural network and the second neural network by comparing the first intermediate image to an interpolated frame calculated using the first refined forward optical flow vector field and the first refined backward optical flow vector field.

8. The computer program product of claim 7, wherein the terrain factor comprises a spatially interpolated ground observation.

9. The computer program product of claim 7, wherein the terrain factor comprises a topographical elevation map.

10. The computer program product of claim 7, further comprising:

program instructions to receive a second intermediate image captured at a second intermediate time between the initial time and the final time;

program instructions to compute a second refined forward optical flow vector field and a second refined backward optical flow vector field for the second target time; and program instructions to compute additional backpropagation losses to train the first neural network and the second neural network by comparing the second intermediate image to a second interpolated frame obtained by interpolating using the second refined forward optical flow vector field and the second refined backward optical flow vector field.

11. The computer program product of claim 7, wherein the backpropagation losses comprise a selection from the group consisting of: reconstruction losses, perceptual losses, warping losses, and smoothness losses.

12. The computer program product of claim 7, further comprising program instructions to use the first neural network and the second neural network to inference a new interpolated frame from a new initial image and a new final image.

13. A computer system for training temporal precipitation interpolation models, comprising:

one or more computer processors, one or more computer readable memories, one or more computer readable storage media, and program instructions collectively stored on at least one of the one or more computer readable storage media for execution by at least one of the one or more computer processors via at least one of the one or more computer readable memories, the program instructions comprising:

program instructions to receive an initial image, a first intermediate image, and a final image showing precipitation in a region, wherein the initial image is captured at an initial time, the first intermediate image is captured at a first target time after the initial time, and the final image is captured at a final time after the first target time;

program instructions to compute a first preliminary forward optical flow vector field from the initial image to the first target time, and a first preliminary backward optical flow vector field from the final image to the first target time using a first neural network;

program instructions to compute a first refined forward optical flow vector field and a first refined backward optical flow vector field for the first target time by inputting (i) the initial image, (ii) the final image, (iii) the first preliminary forward optical flow vector field, (iv) the first preliminary backward optical flow vector field, and (v) a terrain factor into a second neural network, wherein the terrain factor comprises a rain motion pressure feature calculated via an element-wise negative inner-product of the first preliminary forward optical flow vector field and a topographic gradient vector field of a topographical elevation map; and program instructions to compute backpropagation losses to train the first neural network and the second neural network by comparing the first intermediate image to an interpolated frame calculated using the first refined forward optical flow vector field and the first refined backward optical flow vector field.

14. The computer system of claim 13, wherein the terrain factor comprises a spatially interpolated ground observation.

15. The computer system of claim 13, wherein the terrain factor comprises a topographical elevation map.

16. The computer system of claim 13, further comprising:

program instructions to receive a second intermediate image captured at a second intermediate time between the initial time and the final time;

program instructions to compute a second refined forward optical flow vector field and a second refined backward optical flow vector field for the second target time; and program instructions to compute additional backpropagation losses to train the first neural network and the second neural network by comparing the second intermediate image to a second interpolated frame obtained by interpolating using the second refined forward optical flow vector field and the second refined backward optical flow vector field.

17. The computer system of claim 13, further comprising program instructions to use the first neural network and the second neural network to inference a new interpolated frame from a new initial image and a new final image.

\* \* \* \* \*